3,257,273
FLY REPELLENT COMPOSITIONS
George F. Shambaugh, Wooster, Ohio, and Morris R. Rogers, Framingham, Arthur M. Kaplan, Waban, and John J. Pratt, Jr., Wayland, Mass., assignors to the United States of America as represented by the Secretary of the Army
No Drawing. Filed Apr. 2, 1964, Ser. No. 356,992
5 Claims. (Cl. 167—31)

The invention described herein, if patent, may be manufactured and used by or for the Government for governmental purposes without the payment to us of any royalty thereon.

This invention relates to an insect repellent and more particularly to a house fly repellent.

The house fly (*Musca domestica*) is a common insect that is found in nearly all of the habitable areas of the world. These insects are especially prevalent during the warm seasons and are found in great numbers in and around those areas containing animal or vegetable refuse or waste. The house fly is known to be responsible for the transmission of disease to man by mechanically carrying the disease organism from a contaminated source to man's food. Typhoid is one such disease known to be so transmitted and many other bacterial and viral diseases are suspected of being similarly transmitted.

The control of the house fly has been extremely difficult because of the ability of this insect to rapidly develop resistance to chemical insecticides. New instances of resistance are continually being reported from all parts of the world. Those insecticides which have been the object of widespread use are now considered to be of little value in controlling the house fly and some of those insecticides which are known to be still effective are, in general, too toxic for widespread use. For these reasons, other methods of controlling house flies have been investigated and one method that currently shows promise is the use of repellent materials.

Accordingly, we have discovered highly effective house fly repellent compositions that are storage stable, retain their repellent activity for unusually long periods of time and are not affected by the presence of organic matter. These compositions comprise a mixture of o-phenylphenol, 6-chloro-2-phenylphenol and 4-chloro-2-phenylphenol or a mixture of their water soluble salts, and in a preferred composition also contain phenol and biphenyl. The components of the compositions of this invention are present in the following preferred proportions:

COMPOSITION I

| | Parts by weight |
|---|---|
| o-Phenylphenol | 20 to 40, e.g., 34.4 |
| 6-chloro-2-phenylphenol | 12 to 24, e.g., 17.4 |
| 4-chloro-2-phenylphenol | 40 to 60, e.g., 48.2 |

COMPOSITION II

| | |
|---|---|
| Sodium o-phenylphenate | 20 to 40, e.g., 35 |
| Sodium 6-chloro-2-phenylphenate | 12 to 24, e.g., 17 |
| Sodium 4-chloro-2-phenylphenate | 40 to 60, e.g., 48 |

COMPOSITION III

| | |
|---|---|
| o-Phenylphenol | 20 to 40, e.g., 29.1 |
| 6-chloro-2-phenylphenol | 20 to 40, e.g., 31.6 |
| 4-chloro-2-phenylphenol | 5 to 14, e.g., 8.2 |
| Phenol | 10 to 35, e.g., 20.9 |
| Biphenyl | 5 to 15, e.g., 10.2 |

The above proportions are merely preferred and set forth by way of illustration as composition containing other proportions are operative as fly repellents.

Repellency of these compositions to house flies was determined by the method of La Brecque and Wilson as described in "The Florida Entomologist," vol. 42, No. 4, December 1959. A semi-circle of filter paper is rolled into the shape of a funnel and placed in the top of a glass beaker forming an inverted cone trap. Five grams of an attractant, a commercial casein hydrolysate (Edamin T), were placed in the bottom of each of two inverted cone traps and a wire screen placed over the attractant in order to prevent the trapped flies from feeding. The filter paper cone of one trap was treated with the repellent composition of this invention and the filter paper cone of the other trap was treated with the solvent used or left untreated. The two traps were placed in a cage containing 100 flies. The traps were left in the cage for 30 minutes and the number of female flies in each trap counted. Only females were considered because they are more strongly attracted to the attractant than are males. The test was valid only if five or more female flies entered the control trap. The results are based on at least six replications conducted on three or more different days.

A repellency index was calculated using the formula:

$$\frac{T-C}{T+C} \times 100$$

where T equals the number of female flies in the repellent-treated trap and C equals the number in the control trap. Essentially this expresses in percentage the flies in the repellent-treated trap less those caught in the control trap. A repellency index of −100 signifies 100% repellency, i.e., no female flies entered the repellent-treated trap. Conversely, a repellency index of +100 signifies 100% attractancy, i.e., no female flies entered the control trap. A repellency index of −33 has been established as the level of significant repellency.

*Example I*

A composition comprising 28.8 parts by weight of sodium o-phenylphenate, 14.6 parts by weight of sodium 6-chloro-2-phenylphenate, and 40.3 parts by weight of sodium 4-chloro-2-phenylphenate was dissolved in sufficient water to make a 1% solution. Filter paper cones were then impregnated with the solution and air dried. Paper cones containing various deposits of the repellent were tested for effectiveness in accordance with the method outlined above and a repellency index obtained for each concentration. A summary of the results is set forth in Table 1.

TABLE 1

| Deposit (mg./sq. ft.): | Repellency index |
|---|---|
| 6.25 | +8.5 |
| 12.5 | −17.9 |
| 25 | −41.5 |
| 50 | −72.6 |

This composition was dissolved in water at a concentration of 2,000 parts per million and sprayed into pit latrines and latrine buckets. The areas were observed to be free of flies for the 24-hour period of the test.

*Example II*

A composition comprising 34.4 parts by weight of o-phenylphenol, 17.4 parts by weight of 6-chloro-2-phenylphenol, and 48.2 parts by weight of 4-chloro-2-phenylphenol were dissolved in acetone to make a 1% solution. Paper cones containing various amounts of the composition were tested in the manner set forth in Example I.

TABLE 2

| Deposit (mg./sq. ft.): | Repellency index |
|---|---|
| 6.25 | −6.5 |
| 12.5 | −35.5 |
| 25 | −58.5 |
| 50 | −83.4 |

Example III

The following composition:

| | Parts by weight |
|---|---|
| o-Phenylphenol | 29.1 |
| 6-chloro-2-phenylphenol | 31.6 |
| 4-chloro-2-phenylphenol | 8.2 |
| Phenol | 20.9 |
| Biphenyl | 10.2 | was dissolved in acetone to make a 1% solution and impregnated on paper cones to achieve various concentrations of repellent thereon. The paper cones were then tested to determine the effective repellency in the manner outlined heretofore and the results are summarized below.

TABLE 3

| Deposit (mg./sq. ft.) | Repellency index |
|---|---|
| 0.78 | −3.1 |
| 1.56 | −32.9 |
| 3.125 | −45.6 |
| 6.25 | −36.9 |
| 12.5 | −27.1 |
| 25 | −57.3 |
| 50 | −76.6 |

The compositions of this invention, except for the water soluble salt composition identified as II, are slightly soluble in water and soluble in most organic solvents, e.g., kerosene, aromatic hydrocarbons, naphtha, etc. The compositions may be utilized in solutions, emulsions, fogs, or aerosols and may be applied to the areas or spaces to be protected by brushing, spraying, etc. The composition may be present in the carrier in amounts as low as 0.1%.

These repellents are suitable for use in every area from which it is desired to repel house flies. Examples of such areas include dumps, refuse piles, decaying plant material, garbage racks, latrines, etc. These compounds work well in the presence of organic matter and at concentrations normally employed are essentially odorless.

While we have disclosed preferred embodiments of our invention, it will be understood that modifications may be made without departing from the spirit and scope of our invention.

We claim:

1. A method of repelling house flies which comprises subjecting said flies to the action of an effective amount of a composition selected from the group consisting of (1) a mixture comprising 20 to 40 parts by weight of o-phenylphenol, 12 to 24 parts by weight of 6-chloro-2-phenylphenol, and 40 to 60 parts by weight of 4-chloro-2-phenylphenol, (2) a mixture comprising 20 to 40 parts by weight of a water soluble salt of o-phenylphenol, 12 to 24 parts by weight of a water soluble salt of 6-chloro-2-phenylphenol, and 40 to 60 parts by weight of the water soluble salts of 4-chloro-2-phenylphenol, and (3) a mixture comprising 20 to 40 parts by weight of o-phenylphenol, 20 to 40 parts by weight of 6-chloro-2-phenylphenol, 5 to 14 parts by weight of 4-chloro-2-phenol, 10 to 35 parts by weight of phenol and 5 to 15 parts by weight of biphenyl.

2. A method of repelling house flies which comprises subjecting said house flies to the action of an effective amount of a composition comprising a mixture of 20 to 40 parts by weight of o-phenylphenol, 12 to 24 parts by weight of 6-chloro-2-phenylphenol, and 40 to 60 parts by weight of 4-chloro-2-phenylphenol.

3. A method of repelling house flies which comprises subjecting said house flies to the action of an effective amount of a composition comprising a mixture of 20 to 40 parts by weight of a water soluble salt of o-phenylphenol, 12 to 24 parts by weight of a water soluble salt of 6-chloro-2-phenylphenol and 40 to 60 parts by weight of the water soluble salt of 4-chloro-2-phenylphenol.

4. A method of repelling house flies which comprises subjecting said house flies to the action of an effective amount of a composition comprising a mixture of 20 to 40 parts by weight of o-phenylphenol, 20 to 40 parts by weight of 6-chloro-2-phenylphenol, 5 to 14 parts by weight of 4-chloro-2-phenylphenol, 10 to 35 parts by weight of phenol and 5 to 15 parts by weight of biphenyl.

5. A house fly repellent composition comprising a mixture of 20 to 40 parts by weight of o-phenylphenol, 20 to 40 parts by weight of 6-chloro-2-phenylphenol, 5 to 14 parts by weight of 4-chloro-2-phenylphenol, 10 to 35 parts by weight of phenol and 5 to 15 parts by weight of biphenyl.

References Cited by the Examiner

UNITED STATES PATENTS

| 2,164,328 | 7/1939 | Hay | 21—43 |
| 2,298,681 | 10/1942 | Coleman | 167—24 |

FOREIGN PATENTS 895,671  11/1953  Germany.

OTHER REFERENCES

Chemical Abstracts, 53:20672f (1959).

King, "U.S. Department of Agriculture, Agriculture Handbook No. 69," 1954, pp. 262 (item No. 8289), 259 (items Nos. 8173, 8175).

Wolcott, Journal of Economic Entomology, vol. 46, No. 2, pp. 374 to 375, April 1953.

JULIAN S. LEVITT, *Primary Examiner.*

JEROME D. GOLDBERG, *Assistant Examiner.*